J. R. PLACE.
LAWN TRIMMER.
APPLICATION FILED MAR. 9, 1908.
912,408.
Patented Feb. 16, 1909.
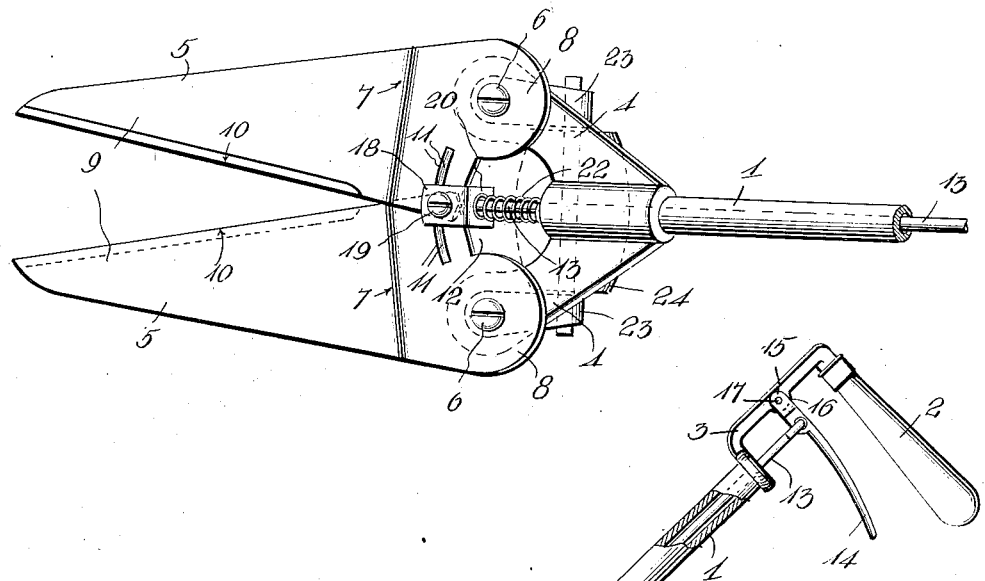
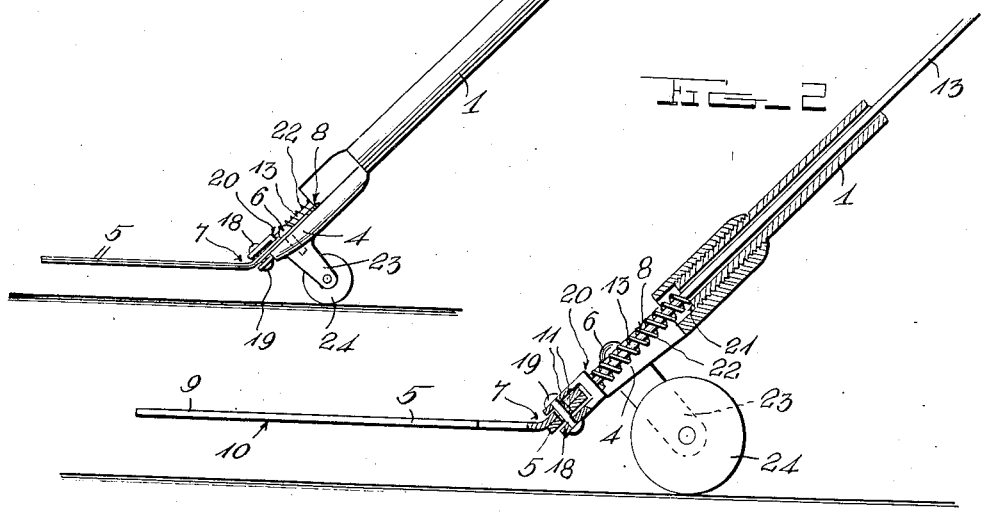
Witnesses
Inventor
Joseph R. Place
By H. B. Willson & Co.
Attorneys

UNITED STATES PATENT OFFICE.

JOSEPH R. PLACE, OF CHICAGO HEIGHTS, ILLINOIS.

LAWN-TRIMMER.

No. 912,408.  Specification of Letters Patent.  Patented Feb. 16, 1909.

Application filed March 9, 1908. Serial No. 420,015.

*To all whom it may concern:*

Be it known that I, JOSEPH R. PLACE, a citizen of the United States, residing at Chicago Heights, in the county of Cook and State of Illinois, have invented certain new and useful Improvements in Lawn-Trimmers; and I do declare the following to be a full, clear, and exact description of the invention, such as will enable others skilled in the art to which it appertains to make and use the same.

This invention relates to lawn trimmers, and has for its object to provide a lawn trimmer adapted to cut the grass around sidewalks, buildings, fences, flower beds, etc., which it is impossible to cut with an ordinary lawn mower.

Another object is to provide a device of this kind which may be conveniently operated with one hand without requiring any stooping on the part of the operator.

Another object is to provide a device of this kind which may be cheaply manufactured, which will be durable and efficient in operation, and which will not get out of order.

With these and other objects my device consists of certain novel features and combination of parts, as will be hereinafter described and claimed.

While herein I describe minute details of my invention, I do not limit myself to these, as the same may be greatly varied without departing from the spirit and scope of the invention.

In the annexed drawings, forming a part of this specification,—Figure 1 is a side elevation, parts being broken away; Fig. 2 is a longitudinal sectional view of the lower part of my device on an enlarged scale; Fig. 3 is a top plan view of the lower portion.

My device, as shown in the drawings, comprises a tubular body handle 1, having a grip handle 2, at the upper end thereof and connected thereto by means of the connecting piece 3. To the lower end of said tubular handle are rigidly secured a pair of outwardly extending arms 4, to which are pivotally secured the cutting blades 5, by means of screws or other suitable devices 6. The cutting blades are bent intermediate of their ends, as at 7, to provide the upper pivoted portion 8 extending in the same direction as the tubular handle, and the lower cutting portion 9 provided with the inwardly pointed cutting edges 10. The blades are thus bent so that the same may lie substantially parallel with the ground, while the handle extends at an angle thereto in convenient position for manipulation, as shown. The upper pivoted portion of the blades overlap each other and are provided with registering slots 11, as shown, said pivot portion being cut away as at 12.

Extending through the tubular handle 1 is the operating rod 13. Said operating rod is engaged with an operating lever 14 bifurcated at its inner end 15 to straddle an ear 16 on the connecting piece 3, to which it is pivoted by means of a rivet or the like 17. The lower end of the operating rod 13 is provided with spaced arms 18 to receive therebetween the slotted portion of the cutting blades. Passing through said arms and through said slots is a rivet or the like 19, whereby the rod 13 is slidably and pivotally connected to the cutting blades. The arms 18 at the lower end of the rod 13 are bent to form a shoulder 20, and a spiral spring 22, is mounted on said rod 13 between the lower end 21 of the tube 1 and the shoulder 20, and is to normally hold the rod 13 at its downward limit of movement.

Projecting downwardly from the outwardly extending arms 4 are the ears 23, between which is rotatably mounted a roller 24, by means of which the lower end of the lawn trimmer is supported during operation and held in spaced relation with the ground over which it moves.

In using my improved lawn trimmer, the grip 2 is held in one hand, the fingers of said hand being passed around the operating lever. The roller 24 is placed on the ground and the operating lever vibrated by means of the fingers to cause the cutting blades to open and close by means of the rod 13, the blades being held normally open by the spiral spring, as has been explained. The cutting blades are thus opened and closed, the lawn trimmer being rolled along as fast as the grass before it is cut.

Having thus described my invention, what I claim as new and desire to secure by means of Letters-Patent is:

1. In combination, a supporting structure, a pair of cutting blades mounted thereon, said cutting blades overlapping each other and being provided with registering slots, an operating lever pivoted to said supporting structure, and means passing through said slots and connected to said operating lever.

2. In combination, a tubular handle having a grip secured at its upper end, outwardly extending arms at its lower end, cutting blades overlapping each other and pivoted one each to said outwardly extending arms, said cutting blades being provided with registering slots, an operating lever pivoted between said grip and the end of said tubular handle, a rod pivoted to said operating lever and passing through said tubular handle, said rod being provided with spaced arms at its lower end, said arms being adapted to receive the overlapping portion of said blades, a pin passed through said arms and said slots, a shoulder at the end of said rod, and a spring disposed between said shoulder and the lower end of said tubular handle.

3. In combination, a tubular handle, a connecting piece extending from the upper end thereof, a downwardly projecting hand grip rigidly secured to said connecting piece, outwardly extending arms rigidly secured to the lower end of said tubular handle, a pair of cutting blades pivoted one each to each of said arms, said cutting blades overlapping and being provided with partially registering slots, an operating lever pivoted to said connecting piece, an operating rod pivotally connected to said operating lever and passing through said tubular handle, spaced arms rigidly secured to the lower end of said rod and receiving the slotted portions of said blades, a pin passed through said arms and through said slots, a shoulder on the lower end of said rod, and a coiled spring disposed around said rod and between the lower end of said tubular handle and said shoulder.

In testimony whereof I have hereunto set my hand in presence of two subscribing witnesses.

JOSEPH R. PLACE.

Witnesses:
 WILLIAM E. PLACE,
 GEO. A. BRINKMAN.